United States Patent [19]

Whelan

[11] 3,896,483

[45] July 22, 1975

[54] SWITCH

[75] Inventor: Maurice Vincent Whelan, Emmasingel, Eindhoven, Netherlands

[73] Assignee: U.S. Philips Corporation, New York, N.Y.

[22] Filed: Sept. 19, 1973

[21] Appl. No.: 398,585

[30] Foreign Application Priority Data

Sept. 23, 1972 Netherlands ........................ 7212912

[52] U.S. Cl. ........................ 357/23; 357/22; 357/41; 307/304; 307/311; 307/293

[51] Int. Cl. ............................................ H01l 11/14

[58] Field of Search ........ 317/235 A, 235 B, 235 N, 317/235 R, 235 UA; 307/311, 304, 293; 357/22, 23, 41

[56] References Cited

UNITED STATES PATENTS

| | | | |
|---|---|---|---|
| 3,171,042 | 2/1965 | Matare | 307/88.5 |
| 3,366,802 | 1/1968 | Hibiben | 307/251 |
| 3,639,813 | 2/1972 | Kamoshida | 317/235 R |
| 3,721,839 | 3/1973 | Shannon | 307/304 |
| 3,786,441 | 1/1974 | Engeler | 340/173 R |

OTHER PUBLICATIONS

Wallmark, Field Effect Transistors, Prentice-Hall, Englewood, N.J., 1966, pp. 799–200.

*Primary Examiner*—Martin H. Edlow
*Attorney, Agent, or Firm*—Frank R. Trifari; Jack Oisher

[57] ABSTRACT

The invention relates to an electronic switch which can be adjusted, for example, in the off-state and then automatically switches in the on-state in a fixed switching time. The switch comprises a field effect transistor, for example a "Junction-FET" or a "deep-depletion-MOST." By applying a voltage at the gate electrode of the FET sufficiently rapidly, a depletion zone can be formed in the channel region, the thickness of said zone decreasing as a function of time until a thermal equilibrium has been achieved. The decrease of the thickness of the depletion zone results in a time-dependent increase of the conductiblity between source and drain of the FET. The switch may furthermore comprise means to accentuate the transition between the off-state and the on-state.

15 Claims, 13 Drawing Figures

SWITCH

The invention relates to an electronic switch comprising two connection terminals for connecting the switch in an electric circuit, which switch shows a first state, hereinafter referred to as on-state, in which the electric conduction between the connection terminals is comparatively large, and a second state, hereinafter referred to as off-state, in which the electric conduction between the connection terminals is comparatively low, said switch furthermore comprising a time mechanism for adjusting the switch in one of the said states, the switch, after setting in said state, automatically changing into the other state after a certain time interval, hereafter referred to as switching time.

Such switches are generally known and may be used, for example, as a time mechanism in photography so as to convey an electric current through an exposure element for a given period of time, which current should then be switched off. Such switches may also be used in a variety of other applications.

The time mechanism by means of which the switch can be set and/or actuated can be controlled in most of the cases in that sense that the switching time of the switch is controllable and in known switches of the above-described type it may be both of a mechanical and an electric nature.

It is an object of the invention to provide an electric switch of the type described in the preamble which is very simple both as regards the structure and as regards its manufacture and which hence is comparatively cheap.

The invention is based on the recognition of the fact that a field effect transistor can simply be used for the said time mechanism.

Therefore, according to the invention, an electric switch of the type described in the preamble is characterized in that the time mechanism comprises a field effect transistor of a type in which the conduction of the channel region can be controlled by controlling the thickness of a depletion region which can be formed in the channel region, the field effect transistor comprising a source region and a drain region of one conductivity type with an intermediate channel region of the same conductivity type and a gate electrode for controlling the conduction of the channel region, means being present for applying a voltage to the gate electrode as a result of which a depletion region is formed in the channel region, the conduction of the channel region becomes comparatively low and the switch is set in one of the said states, it being then possible for the thickness of the depletion region to decrease as a result of the availability of charge carriers, for example, as a result of thermal generation, so that the conduction of the channel region increases and the switch changes to the other state.

The invention uses the possibility of forming in a semiconductor body a depletion region which is in a non-equilibrium condition and whose thickness consequently will vary as a function of time, as is the case with any system which is in a non-equilibrium condition and which will endeavour automatically, and, in accordance with circumstances, moreor less rapidly, to reach an equilibrium condition. By forming such a depletion region in the channel region of a field effect transistor of the above-described type, the variation of the thickness of the depletion region can be converted into a detectable variation in the conduction of the channel region of the field effect transistor which, when operated in this manner, may advantageously be used in the time mechanism of the switch of the type described in the preamble.

The source region and the drain region of the field effect transistor can be directly connected conductively to the output terminals of the switch which can be set in the "off-state" and can then change into the "on-state" due to the decreasing thickness of the depletion region of the "off-state". However, the switch may also comprise, for example, one or more relays which are controlled by the field-effect transistor and by which the switch can be set in the on-state and change from the on-state into the off-state.

Besides for important other advantages which will be described in detail hereinafter, the field-effect transistor is preferably set in a state in which the conduction of the channel region is as small as possible so as to minimize the energy dissipation. A preferred embodiment of an electric switch according to the invention is therefore characterized in that by applying the said voltage to the gate electrode, a depletion region is formed which extends substantially throughout the thickness of the channel region and which electrically insulates the source region and the drain region substantially entirely from each other.

The extra charge carriers which are necessary when the thickness of the depletion region decreases, can be formed inter alia by thermal generation which takes place in particular in the depletion region itself. In case no further sources are present from which charge carriers can be supplied, the switching time of the switch is determined by the value of the thermal generation. Generally this is very strongly dependent upon temperature and increases when the temperature increases. This fact may advantageously be used to obtain switches the switching time of which is determined or controlled by the temperature prevailing during operation.

A preferred embodiment of a switch according to the invention is characterized in that extra means are present to supply charge carriers. A further preferred embodiment is characterized in that the supply of charge carriers and hence the switching time are controllable by means of the said extra means.

In a first important embodiment, said extra means comprise a source of radiation, for example a light source.

A further preferred embodiment of a switch according to the invention which has very important advantages is characterized in that the said extra means for supplying charge carriers comprise a rectifying junction which is at least temporarily biased in the forward direction.

The rectifying junction may be formed, for example, by a p-n junction which is provided, for example, in the source region or in the drain region of the field effect transistor, or by a Schottky junction between one of the regions of the field effect transistor and a suitable conductor. By biasing the rectifying junction in the forward direction, charge carriers of the desired polarity can be supplied as a result of which the thickness of the depletion layer can decrease more rapidly than when the charge carriers would be supplied only by thermal generation.

In order to obtain an efficiency of the diode current which is as high as possible, it is desirable that a part of the current which is as large as possible, consists of charge carriers of the desired polarity. In the case in which the rectifying junction is formed by a p-n junction, this can be achieved by giving the semi-conductor zones between which the p-n junction is formed a different doping concentration and that in such manner that the zone comprising the desired charge carriers has a much higher doping concentration than the other zone.

Moreover, in order to obtain a high efficiency, little recombination of the charge carriers supplied by the rectifying junction should occur. For that purpose, a further preferred embodiment of a switch according to the invention is characterized in that the distance between the rectifying junction and the depletion region is at most equal to the diffusion length of minority charge carriers in the channel region.

The switching time of the switch can be set arbitrarily, for example, by setting up across the rectifying junction a voltage of a variable value and by controlling the diode current by means of the voltage.

An important preferred embodiment of a switch according to the invention which inter alia has the advantage that the voltage across the rectifying junction can vary automatically during operation is characterized in that the rectifying junction belonging to the means supplying the said charge carriers is provided in the source region or the drain region of the field effect transistor and that by applying a voltage to the gate electrode a depletion region is formed so that the said region of the field effect transistor comprising the rectifying junction is brought to an electrically floating potential. In this connection, a zone or a region is assumed to have a floating potential if said zone or said region has no electric connection as a result of which the potential of the zone or the region in the presence of said connection would have another value than in the absence thereof. As a result, the charge carriers supplied by the rectifying junction remains small until the thickness of the depletion region has decreased to such an extent that a conductive channel is formed between the source region and the drain region. From that instant, a kind of "snowballing" occurs which results in a sharp transition between the off-state and the on-state of the switch.

A further preferred embodiment of a switch according to the invention is characterized in that the said extra means supplying charge carriers comprise at least one further rectifying junction which is at least temporarily biased in the forward direction. The instant at which a conductive channel is formed between the source region and the drain region of the field effect transistor and hence the switching time of the switch can be accurately adjusted by means of said further rectifying junction.

In a preferred embodiment of a switch according to the invention the field-effect transistor is a deep-depletion MOST, the depletion region of which can be formed by the sufficiently rapid application of a voltage difference between the gate electrode and the channel region.

A further embodiment of a switch according to the invention is characterized in that the field-effect transistor is a junction field effect transistor (JFET). According to the invention, a preferred embodiment is characterized in that the said time mechanism comprises a first junction field effect transistor having a source region and a drain region and an intermediate channel region of a first conductivity type, a rectifying junction which belongs to the said extra means supplying charge carriers being provided in the source region or in the drain region, and a second junction field effect transistor having a gate electrode which is conductively connected to the gate electrode of the said first field effect transistor. In this embodiment, the connection terminals of the switch may be contacted, for example, with the source region and the drain region of the second field-effect transistor, while the first field-effect transistor may be used to produce a sharp transition between the off-state and the on-state by means of the already described "snowballing."

The doping concentration of the channel regions of the field-effect transistor are preferably substantially equal to each other. For that purpose, the field-effect transistors may advantageously be provided in one common semiconductor body.

A preferred embodiment which inter alia has the additional advantage that the field-effect transistors can be manufactured with the conventional planar semiconductor methods and hence be integrated in a common semiconductor body to form an integrated circuit together with possibly other circuit elements, such as transistors, diodes, resistors, an so on is characterized in that the switch comprises a semiconductor body having an epitaxial layer of one conductivity type which adjoins a surface of the semiconductor body and is provided on a semiconductor substrate of the opposite conductivity type, the source region and the drain region of the fieldeffect transistor being formed by regions of the epitaxial layer adjoining the said surface.

In order to prevent minority charge carriers from flowing into the epitaxial layer from the substrate, a voltage in the reverse direction is preferably applied across the p-n junction between the substrate and the epitaxial layer. In the case in which the field-effect transistor is formed by a JFET, the substrate may advantageously be used as a gate electrode of the field-effect transistor. The advantage occurs inter alia that the capacity between the gate electrode and the channel region is comparatively large, as a result of which comparatively long switching times can be obtained.

A further preferred embodiment is characterized in that the substrate forms a common gate electrode for the said two field-effect transistors, in which buried zones which have the same conductivity type as and a higher doping than the substrate are provided at the area of the interfaces between the substrate and the channel region of the first-mentioned field-effect transistor and between the substrate and the channel region of the second field effect transistor, and in which the rectifying junction belonging to the extra means conveying the said charge carriers is formed by the p-n junction between the epitaxial layer of one conductivity type and a surface zone of the opposite conductivity type provided in the epitaxial layer.

Preferably the channel region of the said first field-effect transistor, which transistor has a rectifying junction which is biased in the forward direction at least temporarily, has a smaller thickness than the channel region of the second field-effect transistor. For that purpose, a narrowing may be provided in the epitaxial layer at the area of the channel region of the first fieldeffect transistor, which narrowing is formed, for example, by a groove or by a surface zone of the opposite conductivity type which extends from the surface of the epitaxial layer into the epitaxial layer. A preferred embodiment is characterized in that at the area of the channel region of the first-mentioned field-effect transistor an oxide layer is provided in the epitaxial layer.

The invention will now be described in greater detail with reference to a few embodiments and the accompanying diagrammatic drawing, in which:

FIG. 2 is a plan view of a first embodiment of a switch according to the invention and of which

Figure 1:
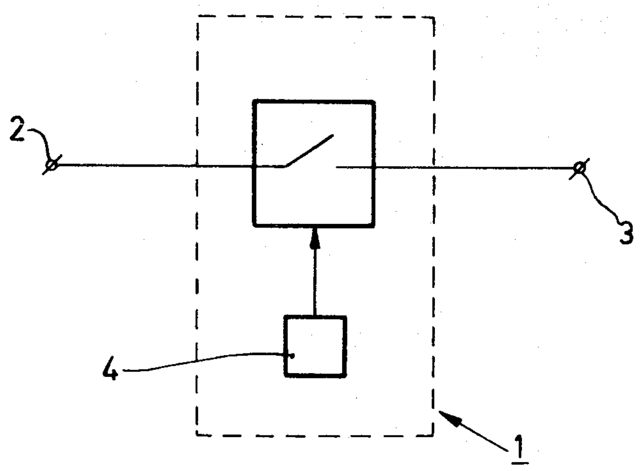
FIG. 1 is a diagrammatic representation of a switch of the type to which the present invention relates.

FIG. 1 shows diagrammatically an electric switch 1 of the type to which the present invention relates, comprising two connection terminals 2 and 3 for connecting the switch 1 into an electronic circuit which is not further shown.

The switch 1 shows a first state, hereinafter termed "on-state," in which the electric conduction between the connection terminals 2 and 3 is comparatively large, and a second state, hereinafter referred to as "off-state" in which the electric conduction between the connection terminals 2 and 3 is comparatively low. The switch 1 furthermore comprises a time mechanism, shown diagrammatically in FIG. 1 by the block 4, for setting the switch in one of the said states, the switch, after having been set in said state, automatically changing from said state into the said other state after a certain period of time, hereinafter termed switching time.

Such a type of switch may be used for a great number of applications, for example, as a control for the exposure time in photography.

Figure 3:
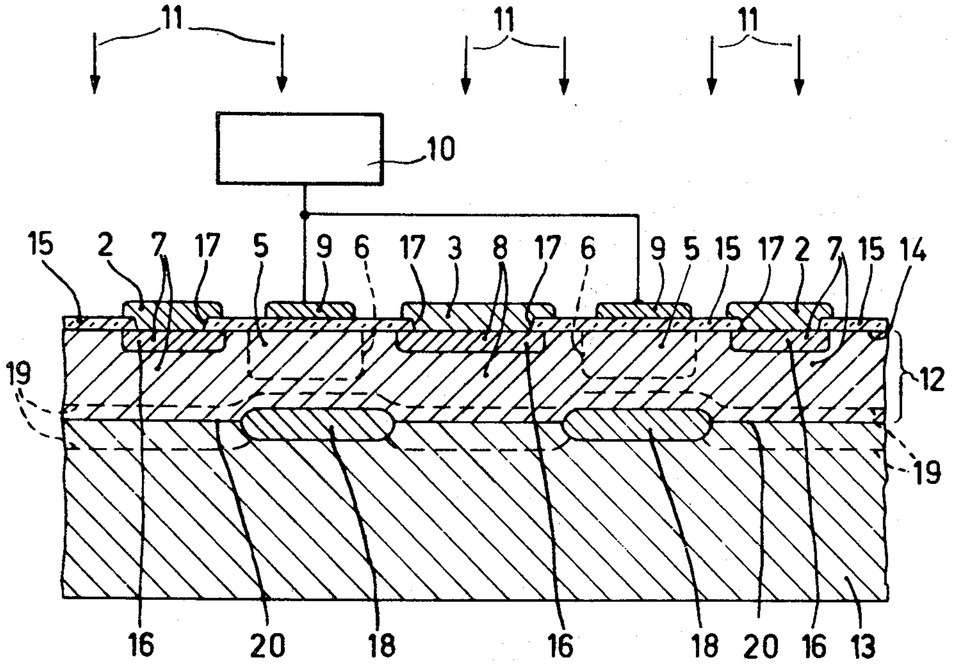
FIG. 3 is a cross-sectional view taken on the line III—III of FIG. 2.
Figure 2:
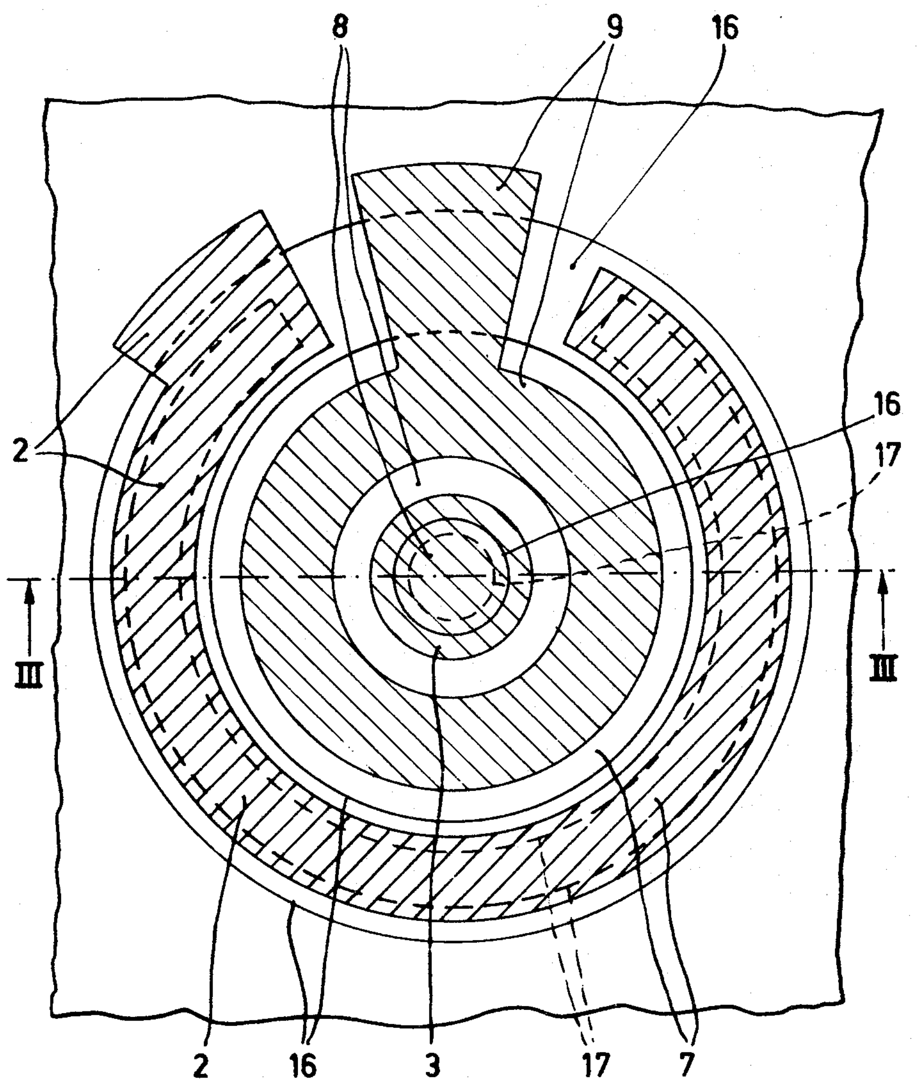

According to the invention the said time mechanism comprises a field-effect transistor of which FIG. 2 is a plan view and FIG. 3 a cross-sectional view and which is of a type in which the conduction of the channel region 5 can be controlled by controlling the thickness of a depletion region 6 which can be formed in the channel region 5.

The field-effect transistor comprises an n-type source region 7, an n-type drain region 8, an intermediately located n-type channel region 5 and a gate electrode 9 for controlling the conduction of the channel region 5.

Present furthermore are means which are shown diagrammatically in FIG. 3 by the block diagram 10 for applying a voltage to the gate electrode 9 as a result of which a depletion region 6 is formed in the channel region 5 as is denoted by the broken lines in FIG. 3. By applying said voltage, the conduction of the channel region 5 becomes comparatively low and the switch 1 is set in one of the said states. In the present embodiment in which the connection terminals 2 and 3 are directly conductively contacted with the source region 7 and the drain region 8, respectively, of the field-effect transistor and hence form a source electrode and drain electrode, respectively, of the field-effect transistor, the switch is set in the off-state by applying the voltage to the gate electrode 9.

After setting up the voltage at the gate electrode 9, the thickness of the depletion region 6 will decrease more or less rapidly in accordance with the circumstances as a result of the fact that charge carriers become available so that the conduction of the channel region 5 increases and the switch is automatically set in the on-state.

The switch described is small and can be manufactured in a simple manner by means of the conventional semiconductor technologies and is hence cheap. The operation of the field-effect transistor as a time switch is based on the fact that, when a sufficiently large voltage of a sufficiently large steepness $dV/dt$ — wherein $t$ is time — is applied to the gate electrode 9, a depletion region 6 is formed in the channel region 5, which depletion region, in the given circumstances, is not in a thermal equilibrium condition so that the thickness of said depletion region will vary in the course of time, as will become apparent hereinafter, and as a result of which the conduction of the channel region 6 and hence also between the connection terminals 2 and 3, will also vary.

The thickness and the doping concentration of the channel region 5 and the value of the voltage at the gate electrode 9 are such that a depletion region 6 is formed which extends entirely or at least substantially entirely throughout the thickness of the channel region 5 and as a result of which the source region 7 and the drain region 8 are insulated substantially entirely from each other. As a result of this, substantially no current can flow between the connection terminals 2 and 3 upon setting the switch in the off-state.

It is to be noted that in FIG. 3 a depletion region is shown which extends over a great part of the thickness of the channel region 5, it is true, but not over the whole thickness, for clarity.

The thickness of the depletion region 6 may decrease in the course of time, for example, as a result of the thermal generation of charge carriers. Since the value of the thermal generation, which takes place in particular in the depletion region 6 itself, is a function of the temperature, the switching time of the switch can advantageously be varied by controlling the ambient temperature.

It is to be noted that the charge carriers are mainly but not necessarily only generated in the depletion region itself. For example, charge carriers which are generated outside the depletion region 6 but within a diffusion length thereof can contribute to achieving the thermal equilibrium condition.

In the present embodiment, extra means are present for supplying charge carriers. These means comprise a source of radiation which is shown diagrammatically in FIG. 3 by the arrows 11 representing a quantity of incident radiation and which may comprise, in addition to a source emitting the radiation 11, also, for example, a diaphragm for controlling the intensity of the radiation 11. The incident radiation 11 can be absorbed in the semiconductor material of the field effect transistor and in particular in the depletion region 6 while forming hole-electron pairs. As a result of this, the depletion region 6 can reach the thermal equilibrium condition associated with the given circumstances in a shorter period of time than when the charge carriers have to be formed only under the influence of the thermal generation.

In the present embodiment the field-effect transistor belongs to the type of field-effect transistors having an insulated gate electrode 9 and comprises a semiconductor body in the form of a semiconductor layer 12 which is formed by an n-type epitaxial silicon layer provided on a p-type substrate 13. The source region 7 and the drain region 8 are formed by parts of the semiconductor layer 12 adjoining the surface 14 of the semiconductor layer 12. The surface 14 of the semiconductor layer 12 comprises an insulating layer 15 on which the gate electrode 9 is provided in the form of a conductive layer which is separated from the semiconductor layer 12 by the insulating layer 15. Such a transistor in which the gate electrode 9 is separated from the channel region 5 by an insulating layer 15 and in which the source region 7, the drain region 9 and the channel region 5 are of the same conductivity type and hence are not separated from each other by a p-n junction and in which the conductibility of the channel region is controlled by controlling the thickness of the depletion region 6 which can be formed by applying a voltage to the gate electrode 9 in the channel region 5, is often referred to in literature as a "MOS"-transistor of the "depletion type" and notably as "deep-depletion MOS-transistor". The expression "MOS" is an abbreviation for "Metal-Oxide-Semiconductor" in which it is to be noted that said expression should be explained within the scope of the invention to be so broad as to also include structures in which the gate electrode 9 is not of metal but, for example, of polycrystalline silicon, or in which the insulating layer 15 does not consist of oxide but, for example, of silicon nitride or a combination of silicon oxide and silicon nitride. In the present embodiment, however, in which the insulating layer 15 should be permeable to the incident radiation 11, silicon oxide is preferably used for the insulating layer 15.

As shown in FIG. 2, the gate electrode 9 of the field-effect transistor has a closed shape viewed in a direction transverse to the surface 14 of the epitaxial layer 12. The part of the epitaxial layer 12 which is enclosed by the gate electrode 9 forms the drain region 8 of the field-effect transistor while at least a part of the epitaxial layer 12 which is present outside the gate electrode 9 and which in the present embodiment surrounds the gate electrode 9 entirely, forms the source region 7 of the transistor.

As shown in FIG. 3, surface zones 16 are provided in the epitaxial layer 12, which are of the same conductivity type as and have a higher doping than the epitaxial layer 12. Said zones which are not shown in FIG. 2 for clarity constitute contact zones for the source region 7 and the drain region 8 and are contacted to the connection terminals 2 and 3 of the switch via windows 17 in the insulating layer 15. The windows 17 in the silicon oxide layer 15, which layer is not shown in FIG. 2 for clarity, are denoted by broken lines in this Figure.

In the present embodiment a buried zone 18 is moreover provided at the interface between the epitaxial layer 12 and the substrate 13, which zone has the same conductivity type as and a higher doping than the substrate 13 and, viewed in a direction transverse to the surface 14, is present below the gate electrode 9. As a result of the higher concentration, the depletion region of the p-n junction 20 between the epitaxial layer 12 and the substrate 13 denoted by broken lines 19 extends deeper in the epitaxial layer 12 at the area of the buried zone 18 than in surrounding places. It is to be noted that the p-n junction 20 during operation is usually biased in the reverse direction so as to prevent holes from flowing from the p-type substrate into the n-type epitaxial layer 12, in particular in the depletion region 6.

Figure 4:
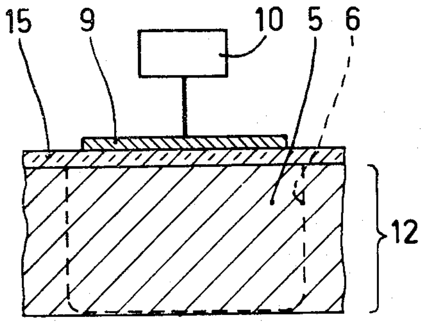
FIGS. 4 to 6 show a part of the structure shown in FIG. 3 in various stages during operation of the switch.
Figure 5:
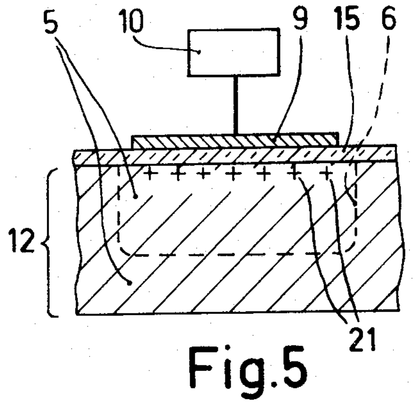
Figure 6:
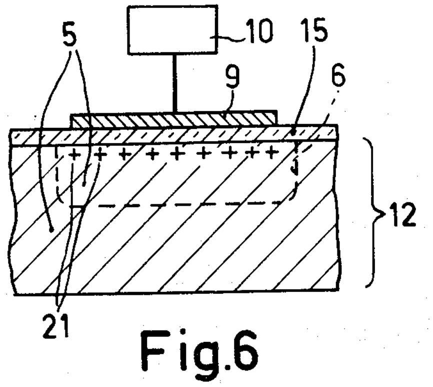

For further explanation of the operation as a time switch of the field-effect transistor described, FIGS. 4, 5 and 6 show on an enlarged scale a part of the field-effect transistor shown in FIG. 3 in various stages during operation, which part comprises a part of the epitaxial layer 12 which is present between the insulating layer 15 and the depletion region 19 and forms the channel region 5 of the field-effect transistor.

FIG. 4 shows the situation in which a voltage pulse is applied to the gate electrode 9 by means of the diagrammatically shown means 10, as a result of which the gate electrode 9 obtains a negative potential relative to the channel region 5 in a sufficiently short period of time. It is assumed that the amplitude of said voltage pulse is sufficiently large to obtain inversion of the conductivity type at the interface between the epitaxial layer 12 and the insulating layer 15, near the gate electrode 9.

By applying said voltage difference between the gate electrode 9 and the epitaxial layer 12, the majority charge carriers which consist of electrons are repelled from the channel region 5 of the epitaxial layer present near the gate electrode 9, so that the depletion region 6 is obtained (see FIG. 4) which is shown in broken lines. The voltage at the gate electrode 9 can easily be chosen by those skilled in the art so that with the given doping concentration of the epitaxial layer 12, the thickness of the channel region 5 and the thickness of the insulating layer 15, a depletion region 6 is formed which extends from the surface 14 throughout the thickness of the channel region 5 down to the depletion region 19, as a result of which a depletion layer (6, 19) is obtained which is present between the source region 7 and the drain region 8 of the field-effect transistor and which extends throughout the thickness of the epitaxial layer 12. Due to the absence of mobile charge carriers in the depletion region (6, 19), the resistivity in the channel region 5 is very high so that the conduction between the source region 7 and the drain region 8 and between the connection terminals 2 and 3 which in the present embodiment constitute a source electrode and a drain electrode, respectively, of the transistor, is very small. Therefore the switch is now in the "off-state."

As already noted, the voltage at the gate electrode 9 is chosen to be so large that with the given doping concentration of the epitaxial layer 12 inversion of the conductivity type is possible at the interface between the epitaxial layer 12 and the insulating layer 15. This means that in the thermal equilibrium condition which is associated with the prevailing temperature and at the given voltage at the gate electrode 9, a semiconductor layer is present at the said interface the conductivity type of which is opposite to that of the epitaxial layer and in which thus the mobile charge carriers are formed by holes. FIG. 6 shows the thermal equilibrium situation in which an inversion layer which is shown by the crosses 21 representing the holes is shown at the said interface. The holes 21 screen the electric field produced by the voltage at the gate electrode 9 at least partly, as a result of which the thickness of the depletion region 6 is smaller than in the absence of the inversion layer 21, and a conductive channel is again present in the channel region 5 between the source region 7 and the drain region 8.

Consequently, by applying the voltage to the gate electrode 9, the transistor can be set in the "off-state" in which the conduction between the source region 7 and the drain region 8 is comparatively low, and then, due to the becoming available of holes for the formation of the inversion layer 21, it can change from the "off-state" to the "on-state" in which the conduction between the source region 7 and the drain region 8 is comparatively large. FIG. 5 shows an intermediate stage which is between the instant at which the depletion region 6 is formed by applying the voltage to the gate electrode 9, as is shown in FIG. 4, and the instant at which the new thermal equilibrium condition is reached, as is shown in FIG. 6.

The rate at which the said thermal equilibrium condition is reached, and hence also the switching time of the switch, is determined by the rate at which the inversion layer 21 can be formed, and thus by the number of available holes, or by the rate at which the holes which are necessary for building up the inversion layer 21 are made available.

Said holes may be formed, for example, under the influence of the thermal generation which takes place in particular in the depletion region 6 itself. In the case in which the thermal generation is the only source supplying holes, a maximum switching time is obtained at the given temperature and voltage at the gate electrode 9. The variation of the conduction $\sigma$ of the channel region 5 under the influence of the thermal generation as a function of time $t$ is shown graphically in FIG. 7 by the curve 22. In this figure, the conduction $\sigma$ of the channel region 5 is plotted in arbitrary units on the vertical axis and the time $t$, also in arbitrary units, is plotted on the horizontal axis, the instant $t = 0$ corresponding to the instant at which the negative voltage pulse is applied to the gate electrode 9. This figure also states the values $\sigma_0$ and $\sigma_1$, $\sigma_1$ being the conduction of the channel region 5 in a thermal equilibrium condition, and $\sigma_0$ being a suitable chosen value for the conduction of the channel region 5 in which, in the case in which the conduction of the channel region 5 is lower than $\sigma_0$, the switch is deemed to be in the "off-state" and, in the case in which the conduction $\sigma$ is larger than $\sigma_0$, the switch is in the "on-state." The value of $\sigma_0$ may, for example, be chosen to be so that the ratio $\sigma_0/\sigma_1$ is approximately 0.5.

Figure 7:
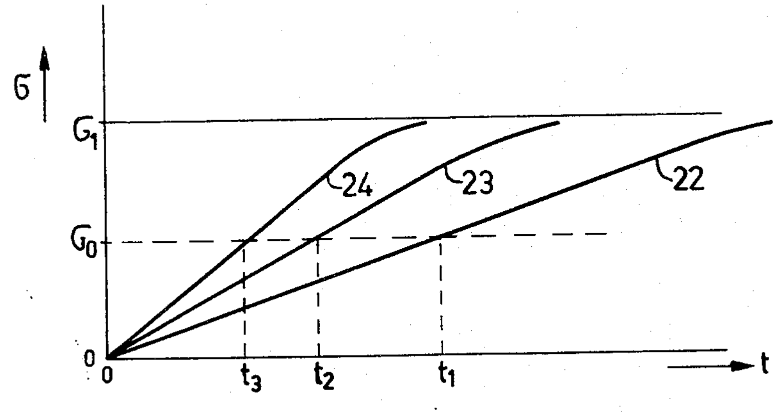
FIG. 7 shows graphically the variation of the conduction of the channel region of the structure shown in FIG. 3 as a function of time *t*.

The curve denoted by 22 shows the variation of the conduction in the case in which the only source for supplying holes is formed by thermal generation. As is shown in FIG. 7, the conduction of the channel region 5 at the instant $t = 0$ is substantially equal to zero (or at least very small) since the depletion regions 6 and 19 extend together throughout the thickness of the epitaxial layer 12.

As a result of the thermal generation of charge carriers, the conduction $\sigma$ then increases gradually until the value $\sigma_1$ associated with the new thermal equilibrium condition is reached. The switching time, by which is to be understood the time interval between $t = 0$ and the instant $t$ at which the conduction $\sigma$ reaches the value $\sigma_0$, is denoted by $t_1$ in FIG. 7.

The curves denoted by 23 and 24 show qualitatively the variation of the conduction $\sigma$ of the channel region 5 for two cases in which radiation is incident on the surface 14 of the epitaxial layer 12, the intensity of the radiation in the case of curve 24 being larger than the intensity of the radiation in the case of curve 23. As is shown in FIG. 7, the slope of the curves which determines the switching times $t_1$ and $t_2$, respectively, given by the points of intersection of the curves with the line $\sigma_0$ depends to a considerable extent on the intensity of the incident radiation 11, and that in such manner that with increasing intensity of the radiation 11 the switching time $t$ of the switch becomes smaller. This may be used advantageously, for example in photography, to obtain a time switch the switching time of which is determined by the light intensity.

It is to be noted that the conduction $\sigma$ in the cases associated with curves 23 and 24 shows a linear variation. It will be obvious, however, that this need not always be the case. It is possible, for example, that, due to a rapid variation of the light intensity, the conduction during operation suddenly also starts to increase more or less rapidly.

Besides the intensity of the radiation 11, the switching times of the above-described switch depend on a number of factors, for example, the lateral dimensions of the field-effect transistor, the choice of the value $\sigma_0$, the voltage at the gate electrode 9, the thickness and/or the transparency of the oxide layer 15, the doping concentrations of the epitaxial layer 12 and the zones 18, and the reverse voltage across the p-n junction 20 between the epitaxial layer 12 and the substrate 13. These factors can be chosen or combined by those skilled in the art in such manner that a switch can be obtained which has the desired properties.

As is shown moreover in FIG. 3, the thickness of the channel region 5 depends upon the thickness of the depletion layer 19 between the p-type substrate and the n-type epitaxial layer. The thickness of said depletion layer 19 is determined, besides by the various doping concentrations, by the voltage across the p-n junction 18. This fact may be used advantageously to cause the switching time of the switch to be determined also by the wavelength of the radiation 11, because the depth of penetration of the radiation 11 depends upon the wavelength. Radiation which is absorbed in the depletion layer 19 (and thus has a comparatively large depth of penetration) generates hole-electron pairs in said depletion layer, the holes of which are removed via the substrate 13. So said radiation does not contribute to the formation of the inversion layer 21 and as a result of this has no influence on the switching time. By controlling the thickness of the depletion layer 19, the wavelength range of said non-effective radiation can advantageously be controlled in this manner.

The structure described in the present embodiment can be manufactured by means of the known planar semiconductor technologies. Starting material is a p-type silicon substrate 13 having a thickness of appproximately 250 μm and a resistivity of 1–5 ohm. cm. In order to obtain the buried p-type zone 18, an annular p-type surface zone is diffused in the substrate via a usual diffusion mask, said zone having the same conductivity type as and a higher doping than the substrate 13. The diffusion mask is then removed after which the n-type epitaxial silicon layer 12 is provided on the substrate 13 by depositing silicon.

The thickness of the epitaxial layer 12 is approximately 3 μm and the resistivity is approximately 0.5 ohm. cm. By means of diffusion of phosphorus atoms via a diffusion mask which is provided on the surface 14 of the epitaxial layer 12, the low-ohmic n-type contact zones 16 are provided.

In a manner conventionally used in semiconductor technology, the gate electrode 9, the source electrode or connection terminal 2, and the drain electrode or connection terminal 3 may then be provided by deposition and etching of aluminum.

The value of the switching time $t_1$ shown in FIG. 7 at room temperature is in the order of a few seconds and can be considerably increased, for example, by means of an extra capacity connected in parallel or by reducing the temperature.

Figure 13:
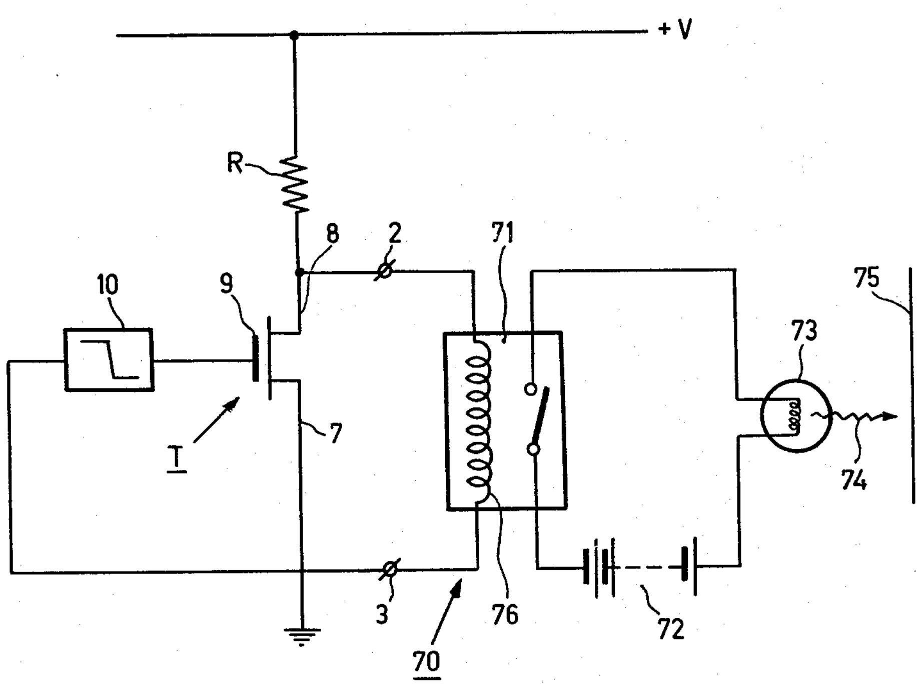
FIG. 13 shows a circuit using the switch of FIG. 1.

FIG. 13 shows by way of example an electric circuit comprising the switch described in the first embodiment. The switch is shown by the field-effect transistor T, the drain zone 8 of which (or connection terminal 2) is connected to a fixed voltage $V$, via the resistor R, while the source zone 7 (or connection terminal 3) is connected to ground. The gate electrode 9 is connected to the voltage source 10 by means of which a negative voltage pulse can be applied to the gate electrode 9.

The connection terminals 2 and 3 are connected to a load circuit 70 which may or may not be energized by means of the voltage between the connection terminals 2 and 3. The circuit 70 comprises inter alia a magnetic relay 71 (shown diagrammatically) by means of which an electric current may or may not be conveyed through the circuit comprising the voltage source 72 and the radiation source 73. The radiation source 73 serves to emit radiation 74 to a photographic plate 75 which should be exposed for a certain exposure time.

When at the instant denoted by $t = 0$ in FIG. 7 a negative voltage pulse is applied with the aid of the means 10, no voltage can flow from $+V$ to earth via the transistor T as a result of the depletion region formed. In this situation the voltage difference between the connection terminals 2 and 3 is substantially equal to $+V$ volt (or at least comparatively large). This voltage — and hence the current through the coil 76 and the magnetic field associated with said current — is chosen to be high enough to be able to energize the relay 71 as a result of which the radiation source 73 can emit electromagnetic radiation 74 to the photographic plate 75.

Since as a result of, for example, the thermal generation the conduction in the channel region of the transistor T increases gradually, the current through the transistor T will also increase gradually. The voltage between the connection terminals 2 and 3 and hence the current through the coil 76 will also decrease gradually. At $t = t_1$ (see FIG. 7) the voltage between the terminals 2 and 3 has decreased to such a value that the current through the coil 76 and the magnetic field strength in or near the coil 76 falls below a threshold value, the relay 71 changing from the on-state into the off-state and the radiation source 73 being no longer energized.

Figure 8:
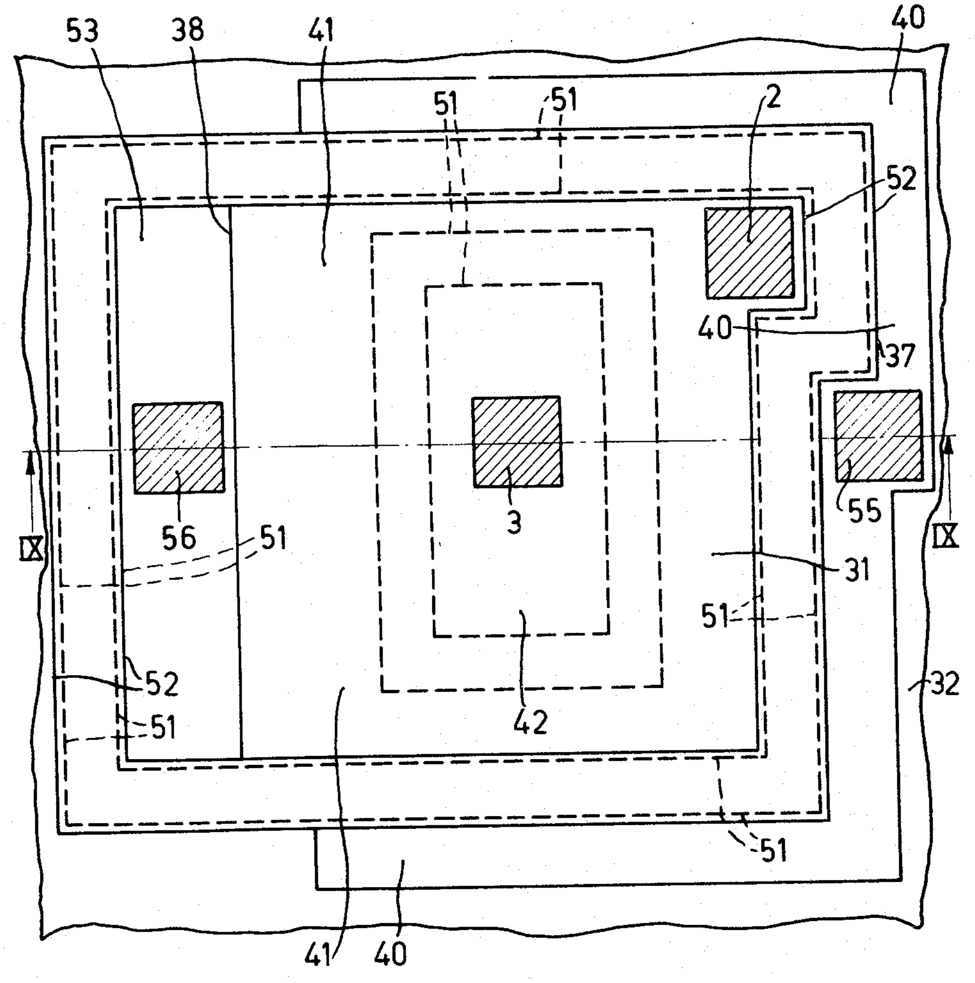
FIG. 8 is a plan view of another embodiment of a switch according to the invention.
Figure 9:
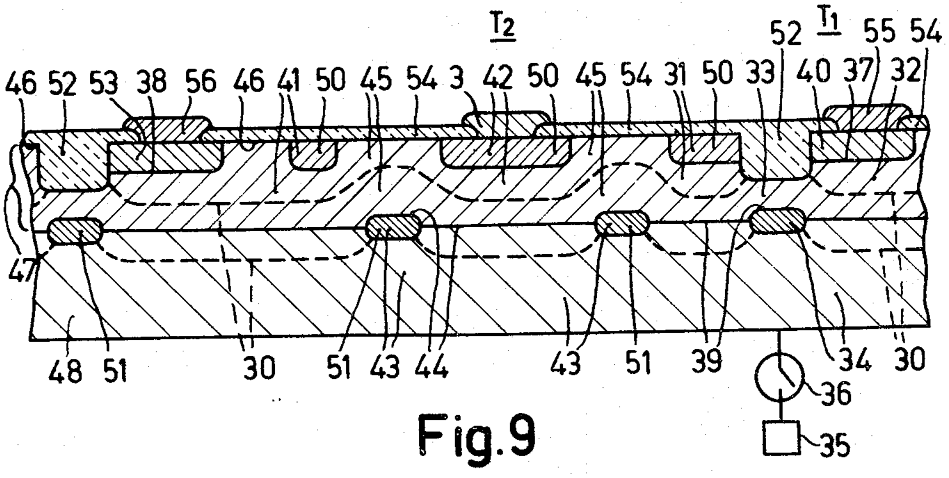
FIG. 9 is a cross-sectional view of the structure shown in FIG. 8 taken on the line IX—IX of FIG. 8.

FIG. 8 is a plan view and FIG. 9 a cross-sectional view of a second embodiment of a time switch according to the invention comprising a time mechanism in the form of a field effect transistor $T_1$ of a type in which the conduction of the channel region can be controlled by controlling the thickness of a depletion region 30.

The field-effect transistor denoted by $T_1$ in FIG. 9 comprises a source region 31 and a drain region 32 of n-type silicon with an intermediately located channel region 33 of likewise n-type silicon and having a gate electrode 34 for controlling the conduction of the channel region 33.

With the aid of the means (35, 36) a voltage can be set up at the gate electrode 34 to form a depletion region 30 which is shown in broken lines in FIG. 9 and which results in a comparatively low conduction of the channel region. Due to the becoming available of charge carriers, the thickness of the depletion region 30 can decrease in the course of time as a result of which the conductibility of the channel region can increase again.

As in the preceding embodiment, the switch comprises extra means for supplying charge carriers. In the present embodiment said extra means are formed by a rectifying junction 37 which is biased in the forward direction at least temporarily and by means of which charge carriers can be injected in the depletion region 30.

In order to minimize the loss of injected charge carriers as a result of recombination, the distance between the rectifying junction 37 and the depletion region 30 is chosen to be at most equal to the diffusion length of minority charge carriers in the channel region 33 of the field-effect transistor $T_1$.

The rectifying junction 37 which belongs to the extra means supplying the said charge carriers is provided in the present embodiment in the drain region 32 of the field-effect transistor $T_1$. The thickness of the channel region 33 and the doping concentration and the voltage at the gate electrode 34 are chosen to be so that a depletion region 30 is formed in the channel region 33 and extends throughout the thickness of the channel region 33. As a result of this the source region 31 and the drain region 32 can be electrically insulated from each other entirely so that the drain region 32 in which the rectifying junction 37 is provided is brought to an electrically floating potential as will be described in detail with reference to FIGS. 11 and 12. In this condition, the injection of charge carriers by the junction 37 can be very small since the forward voltage across the junction is small. At the instant, however, that a conductive channel is formed in the channel region 33 and hence the potential of the drain region 32 is being determined by the potential of the source region 31, the injection of charge carriers can increase very rapidly as a result of the increasing voltage across the junction 37.

In order to be able to adjust at will the instant at which the said conductive channel is formed in the channel region 33, the said extra means supplying charge carriers at least one further rectifying junction 38 which is biased in the forward direction. A small constant voltage may then be set up across said junction, which results in a comparatively small but constant injection of charge carriers in the depletion region 30.

The field-effect transistor $T_1$ in the present embodiment is a JFET. Means which are shown diagrammatically by the switch 36 are present with the aid of which the gate electrode 34 can be temporarily connected to a voltage source which is denoted diagrammatically by the block 35 in FIG. 9. After applying the voltage to the gate electrode 34, the connection between the gate electrode 34 and the voltage source 35 can be interrupted by means of the switch 36.

The depletion region 30 can be formed by connecting the gate electrode 34 to the voltage source 35. After interrupting the connection between the gate electrode 34 and the voltage source 35, the thickness of the depletion region 30 decreases according as there are charge carriers available to compensate for the space charge in the gate electrode 34. Besides by thermal generation, the charge carriers required for this purpose may be supplied, as already explained, by the rectifying junctions 37 and 38.

In the present embodiment, the time mechanism of the switch comprises a first junction field-effect transistor $T_1$. The transistor $T_1$ comprises an n-type source region 31, an n-type drain region 32, and an intermediately located n-type channel region 33, the rectifying junction 37 belonging to the said extra means supplying charge carriers being provided in the drain region 32. In this case the rectifying junction 37 is formed by a p-n junction between the n-type drain region 32 and a p-type zone 40 diffused in the drain region 32.

The connection terminals 2 and 3 of the switch can be directly contacted with the source region 31 and, for example, with the p-type zone 40. In the embodiment described, the connection terminals 2 and 3, however, are contacted with the source region 41 and the drain region 42 of a second junction field-effect transistor $T_2$.

As the transistor $T_1$, the transistor $T_2$ comprises an n-type source region 41 and a likewise n-type drain region 42 and an intermediately located n-type channel region 45, and a gate electrode 43 which is conductively connected to the gate electrode 34 of the said first field-effect transistor $T_1$.

It is to be noted that in the embodiment described the source region 31 of the transistor $T_1$ also forms part of the source region 41 of $T_2$, which is present entirely around the drain region 42 of the field-effect transistor $T_2$, so that the source region 31, 41 is common to the transistors $T_1$ and $T_2$.

By setting up a voltage at the gate electrode 34 of the field effect transistor $T_1$, a depletion region 30 is formed also in the channel region 45 of the field-effect transistor $T_2$ besides in the channel region 33 of the transistor $T_1$, as a result of which the conduction between the connection terminals 2 and 3 becomes comparatively low. In addition, likewise because the gate electrodes 43 and 34 are conductively connected together, the thickness of the depletion region 30 at the area of the channel region 45 of $T_2$ becomes smaller according as more holes are placed available by the p-n junction 37 in the drain region 32 of $T_1$.

In order to obtain a relatively large switching time, the channel region 32 of the first-mentioned field-effect transistor $T_1$ shows a smaller thickness than the channel region 45 of the said second field-effect transistor $T_2$. As a result of this, by setting up a voltage at the gate electrodes 34 and 43 of the field-effect transistors $T_1$ and $T_2$, a deplection region 30 may be formed which extends in the channel region 45 of the second field-effect transistor $T_2$ over a larger thickness than in the channel region 33 of the first field-effect transistor $T_1$. A conductive channel, albeit high-ohmic, may already be present in the channel region 45 between the source region 41 and the drain region 42 of the field-effect transistor $T_2$, as is shown in FIG. 9, while at the same time the source region 31 and the drain region 32 in field-effect transistor $T_1$ are still electrically insulated entirely from each other in that the depletion region 30 still extends over the narrower channel region 33. Only after the thickness of the depletion region has reduced to a sufficient extent can a conductive channel be formed in the field-effect transistor $T_1$ between the source region 31 and the drain region 32, as a result of which the forward voltage across the p-n junction 37 can become sufficiently large to produce an accelerated decomposition of the depletion region 30.

In the present embodiment the switch comprises a semiconductor body having an n-type epitaxial layer of silicon which adjoins the surface 46 of the semiconductor body and which is provided on a p-type silicon substrate 48. The source regions 31 and 41, respectively, and the drain regions 32 and 42, respectively, of the field-effect transistors are formed by regions of the epitaxial layer 47 which adjoin the surface 46 and which, as is shown in FIG. 9, may be provided with surface zones 50 which have the same conductivity type as and a higher doping than the epitaxial layer 47 and which form low-ohmic contact zones for the source regions and drain regions of the field-effect transistors $T_1$ and $T_2$.

The p-type substrate 48 forms a common gate electrode (34, 43) for the two field-effect transistors $T_1$ and $T_2$, so that no further means need be provided to connect the gate electrodes 34 and 43 of the field-effect transistors $T_1$ and $T_2$, respectively, conductively together.

At the area of the interface between the substrate 48 and the channel region 33 of the field-effect transistor $T_1$ and between the substrate 48 and the channel region 45 of field-effect transistor $T_2$, p-type buried zones 51 are provided which are of the same conductivity type as and have a higher doping than the p-type substrate 48. As a result of said p-type zones which are shown in broken lines in FIG. 8, the depletion region 30 may extend, for example, at the area of the channel region 45 throughout the thickness of the epitaxial layer 47 without reaching, for example, a rectifying junction 37 which is formed by a p-n junction between the epitaxial layer 47 and the p-type surface zone 40 provided in the epitaxial layer so that punch-through between the substrate 48 and the p-type surface zone 40 is avoided.

The different thicknesses of the channel regions 33 and 45 are obtained in the present embodiment in that at the area of the channel region 33 of the first field-effect transistor $T_1$ an oxide layer 52 is provided in the epitaxial layer 47. From the surface 46 of the epitaxial layer 47, the oxide layer 52 is inset in the epitaxial layer 47 substantially throughout its thickness and together with the oppositely located buried zone 51 determines the thickness of the channel region 33 of the field-effect transistor $T_1$ present between the oxide layer 52 and the buried zone 51.

The p-type surface zone 40 adjoins the inset oxide 52 so that a compact structure can be obtained.

The p-type surface zone 40 as well as the p-type zone 53 which forms the further rectifying junction 38 with the n-type epitaxial layer 47 are contacted, via contact windows in the passivating layer 54 of silicon oxide provided on the surface 46, with the contact pads 55 and 56, respectively.

The connection terminals 2 and 3 in the form of contact pads (see FIGS. 8 and 9) are also contacted, via windows in the oxide layer 54, with the source region 41 and the drain region 42, respectively, of the field-effect transistor $T_2$, the connection terminal 2 also forming a connection member for the source region 31 of the field-effect transistor $T_1$.

It is to be noted that in the plan view of FIG. 8 the oxide layer 54 is not shown, nor are the contact windows in the oxide layer. The buried p-type zones 51 are shown in broken lines in FIG. 8.

Figure 10:
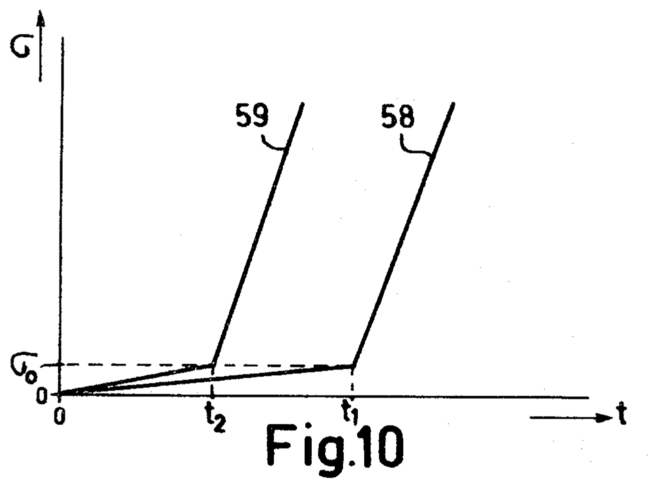
FIG. 10 shows graphically the variation of the conduction of the channel region of the transistor $T_2$ shown in FIG. 9 as a function of time *t*.
Figure 11:
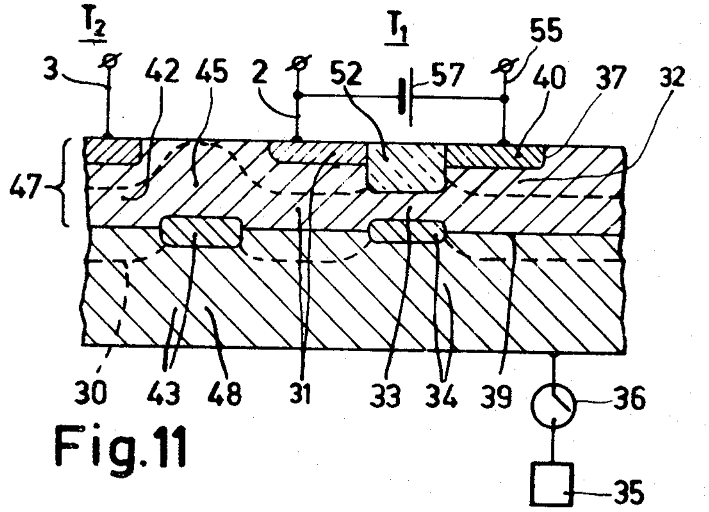
FIGS. 11 and 12 show a part of the structure shown in FIG. 9 in various stages during operation of the switch.
Figure 12:
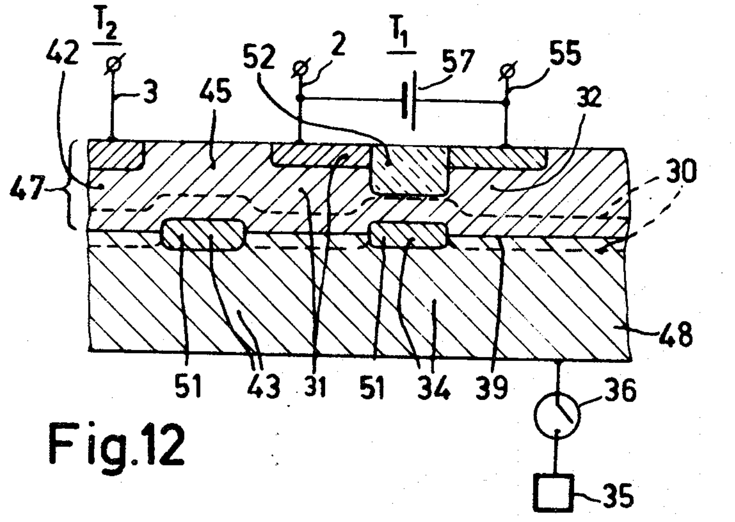

The operation of the switch described in this embodiment will now be described in detail with reference to FIGS. 10, 11 and 12. FIG. 10 shows the variation of the conduction $\sigma$, expressed in arbitrary units, on the vertical axis of the diagram as a function of time $t$ which is plotted on the horizontal axis of the diagram, likewise in arbitrary units. FIGS. 11 and 12 show a part of the structure shown in FIG. 9 at different instants during operation of the switch, said part comprising inter alia the source region 31, the channel region 33 of the field-effect transistor $T_1$ and the p-ype surface zone 40, and a part of the channel region 45 and of said drain region 42 of the field-effect transistor $T_2$.

In FIGS. 11 and 12 the oxide layer 54 is not shown to avoid complexity of the drawing. The connection terminals 2 and 3 of the switch and the contact pad 55 of the p-type surface zone 40 are shown diagrammatically only in these figures. A forward voltage which is shown diagrammatically by a voltage source 57 connected between the connection terminal 2 and the contact pad 55 is set up across the p-n junction 37.

First the substrate is connected to the voltage source 35 by means of the switch 36 as a result of which a reverse voltage is set up across the p-n junction 39 between the substrate 48 and the epitaxial layer 47. With the given thickness of the epitaxial layer 47 and the doping concentrations of the epitaxial layer 47 and the buried zones 51, said voltage is chosen to be so large that a depletion region 30 is formed which extends throughout the thickness of the epitaxial layer, as is shown in FIG. 11 at the area of the channel region 45 of the field-effect transistor $T_2$. As a result of this, substantially no conduction is possible between the source region 41 and the drain region 42 and hence also between the connection terminals 2 and 3 of the switch.

At the same time, the depletion region 30 also extends throughout the thickness of the channel region 33 of field-effect transistor $T_1$, so that the drain region 32 in which the p-type surface zone 40 is provided, is brought at a floating potential, electrically. The voltage across the p-n junction 37 thus becomes very small, at least very much smaller than the voltage supplied by the voltage source 57 and the greater part of which is set up across the depletion region 30 present in the channel region 33. The injection of holes by the p-n junction 37 in the depletion layer 30 thus is negligibly small, at least in this condition.

At the instant $t = 0$ at which the connection between the substrate 48 which forms the gate electrode of the field-effect transistors $T_1$ and $T_2$ and the voltage source 35 is interrupted by means of the switch 36, the conduction of the channel region 45 between the connection terminals 2 and 3 of the switch is substantially equal to zero or is at least very small as is denoted by curve 58 in FIG. 10.

In case no holes are supplied by the p-n junction 38, the thickness of the depletion region 30 can only decrease due to the thermal generation of holes, since substantially no forward voltage is set up at the p-n junction 37 and since the connection of the substrate 48 to the voltage source 35 has been interrupted by means of the switch 36 and hence no holes can be supplied to the substrate via said route. As is denoted by curve 58 in FIG. 10, the conduction of the channel region 45 of transistor $T_2$ initially increases gradually as a result of the thermal generation. Although a conductive channel is formed in the channel region 45, the structure of the switch can be chosen to be so that the conduction of said conductive channel remains comparatively small as compared with the conduction of the channel region 45 in the case in which no depletion region 30 is present.

Since moreover the thickness of the depletion region 33 of transistor $T_1$ is smaller than the thickness of the channel region 45 of transistor $T_2$, the source region 31 and the depletion region 32 of transistor $T_1$ remain electrically insulated from each other from the instant $t = 0$ for a certain time which is substantially equal to the switching time, as a result of the depletion region 30 which remains extending throughout the thickness of the channel region 33.

At the instant $t_1$ denoted in FIG. 10, the thickness of the depletion region 30 has decreased to such an extent that a conductive channel is also formed in the channel region 33 of transistor $T_1$ between the source region 31 and the depletion region 32 of the transistor $T_1$. This channel (see FIG. 12) connects the drain region 32 with the source region 31 so that the voltage across the p-n junction 37 between the p-type surface zone 40 and the drain region 32 can increase. From this instant the p-n junction 37 can inject holes in the depletion region 30 as a result of which the thickness of the depletion region 30 further decreases and the conduction of channel region 45 of transistor $T_2$ increases more rapidly. At the same time, however, the conduction of the channel region 33 of the field-effect transistor $T_1$ also increases as a result of the injection of holes across the junction 37, as a result of which the forward voltage across the p-n junction 37 can increase further and the injection of holes across the p-n junction 37 can increase further. In other words, a kind of snowballing occurs which, as is shown in FIG. 10, results in a very rapid variation of the conduction of the channel region 45 and hence also of the conduction between the connection teminals 2 and 3, in contrast with the preceding embodiment in which the variation of the conduction between the connection terminals 2 and 3 showed a more gradual variation.

The instant $t$ at which a conductive channel is formed in the channel region 33 of field-effect transistor $T_1$ and at which the switch changes from the off-state into the on-state — and which is thus substantially equal to the switching time of the switch — can be adjusted at will in the present embodiment by means of the rectifying p-n junction 38. By setting up a voltage of the suitable value across said junction via the connection contact 56, holes can be injected in the depletion region 30 by said junction 38 besides by thermal generation, after the connection between the substrate 48 and the voltage source 35 has been interrupted. The variation of the conduction of the channel region 45 of transistor $T_2$ as a function of the time $t$ is represented for this case by the curve 59 in FIG. 10. As is shown in this figure, the switching time $t$, denoted by $t_2$, becomes smaller by applying a- small - forward voltage across the junction 38 than in the case in which the required holes can be supplied only by thermal generation. By applying a suitable forward voltage across the junction 38, the switching time of the switch can be adjusted at a desired value.

Besides on the applied voltages, the value of $t_0$, $t_1$ and so on, depend on a number of factors, for example, the lateral dimensions, the doping — or the resistivity — of the various zones and regions and, for example, also on the temperature. All these factors can easily be combined by those skilled in the art in such manner that a switch having the desired properties can be obtained within reasonable limits.

The p-type substrate 48 in the present embodiment has a resistivity of 1 to 5 ohm. cm. The epitaxial layer has a thickness of approximately 4 $\mu$m and a resistivity of 0.5 ohm. cm. The thickness of the inset oxide layer 52 which determines the difference between the thickness of the channel region 33 of transistor $T_1$ and the thickness of the channel region 45 of transistor $T_2$, is approximately 0.3 $\mu$m. Dependent upon the further lateral dimensions and the voltages used and possibly on further parallel arranged capacities, the switching time can be adjusted over a very wide range.

Starting material for the manufacture of the structure shown in FIGS. 8 and 9 is a p-type silicon substrate 48 having a thickness of approximately 200 $\mu$m and a resistivity of 1–5 ohm. cm. By means of diffusion of boron atoms via a diffusion mask, p-type surface zones are provided in the substrate to obtain the p+-type buried zones 51, which surface zones have the same conductivity type as and a higher doping than the substrate 48. After removing the said diffusion mask, the n-type epitaxial silicon layer 47 having a thickness of approximately 4 $\mu$m and a resistivity of 0.5 ohm. cm. is provided on the p-type substrate 48.

In a manner known in semiconductor technology, the inset oxide layer 52 is then provided by means of local oxidation of the surface 46. The silicon surface 46 may be locally masked against the oxidation by means of a layer of silicon nitride. The oxidation treatment is continued until an oxide layer 52 has been obtained which extends from the surface 46 of the epitaxial layer 47 approximately 0.3 $\mu$m deep in the epitaxial layer 47.

After providing the inset oxide layer 52, the $n^+$-type contact zones and the p-type surface zones 40 and 53 can be provided in the epitaxial layer 47 in the usual manner by means of diffusion of phosphorus atoms and boron atoms, respectively, via diffusion masks and by provided with contacts 2, 3, 55 and 56 by means of further known methods, the contacts 2 and 3 forming the connection terminals of the switch.

It will be obvious that the invention is not restricted to the embodiments described but that many variations are possible to those skilled in the art without departing from the scope of this invention.

For example, the transistor $T_2$ in the second embodiment may advantageously be provided with an insulated gate electrode which is provided on the insulating layer 54 and is separated from the underlying channel region 45 by said layer and which viewed in a direction transverse to the surface 46 of the epitaxial layer 47 is present above the channel region 45 and surrounds the drain region 42 of the transistor $T_2$. By setting up a voltage at said insulated gate electrode, a depletion region may be formed in the channel region 45 of transistor $T_2$, which region extends from the surface 46 of the epitaxial layer 47 in the epitaxial layer 47 and cuts off the channel region 45 together with the depletion region 30 which extends from the substrate 48 in the epitaxial layer 47.

As a result of this, a depletion region can advantageously be formed nevertheless in the channel region 45 of $T_2$ by means of a lower reverse voltage across the p-n junction 49 between the substrate 48 and the epitaxial layer 47, which depletion region extends throughout the thickness of the channel region 45 so that inter alia the possibility that "punch-through" occurs between the substrate 48 and the p-type surface zone 40 and/or p-type zone 53 becomes considerably smaller.

In order to reduce the energy dissipation, a capacitor may be used for the voltage source 57 in the second embodiment, which capacitor has a sufficiently high capacity and which has been charged to a sufficiently high voltage of the correct polarity.

The conductivity types of the various regions may be reversed while adapting the applied voltages, in that sense that n-type regions become p-type regions and p-type regions become n-type regions.

Instead of silicon, other semiconductor materials such as, for example AIII-BV compounds may also be used.

The said structures may be integrated in a common semiconductor body together with other circuit elements of an electric circuit, for example, transistors, diodes, resistors and so on.

Furthermore, in the embodiments described, an island insulation may be provided in the epitaxial layers around the structure shown, which insulation is formed, for example, by a p-type zone which extends from the surface of the epitaxial layer down to the substrate, or by an inset oxide layer which may also extend throughout the thickness of the epitaxial layer.

What is claimed is:

1. A time delay device comprising a field-effect transistor having a semiconductor body comprising spaced source and drain regions of one type conductivity defining therebetween a channel region of said one type conductivity and a gate electrode for controlling the conduction level of the channel region, said gate electrode when pulsed establishing a depletion region in the channel reducing the conduction in the channel to a low level, and means for automatically increasing the conduction in the channel to a high level after a controlled time interval, said conduction increasing means including a rectifying junction within the body and means connected to the rectifying junction for at least temporarily biasing same in the forward direction, said biasing value being such that carriers injected by the forward baised junction cause contraction of the depletion region and increased channel conduction at a controlled rate producing the high level channel conduction at the end of the controlled time interval.

2. A time delay device as claimed in claim 1, wherein the value of said gate pulse is such that a depletion region is formed which extends substantially throughout the thickness of the channel region and which substantially electrically insulates the source region and the drain region from each other.

3. A time delay device as claimed in claim 2, wherein the distance between the rectifying junction and the depletion region is at most equal to the diffusion length of minority charge carriers in the channel region.

4. A time delay device as claimed in claim 1, wherein the rectifying junction belonging to the conduction increasing means is located in one of the source region and the drain region of the field-effect transistor, and the pulse applied to the gate electrode is such that a depletion region is formed in the channel region of the field-effect transistor and which extends throughout the thickness of the channel region and electrically insulates the source region and the drain region substantially entirely from each other whereby the said one region of the field-effect transistor containing the rectifying junction assumes an electrically floating potential.

5. A time delay device as claimed in claim 4, wherein the conduction increasing means comprises at least one further rectifying junction which is at least temporarily biased in the forward direction.

6. A time delay device as claimed in claim 1, wherein the field-effect transistor is an insulated gate field-effect transistor.

7. A time delay device as claimed in claim 1, wherein the semiconductor body has an epitaxial layer of one conductivity type which adjoins a surface of the semiconductor body and is provided on a semiconductor substrate of the opposite conductivity type, the source region and the drain region of the field-effect transistor being formed by regions of the epitaxial layer adjoining the said surface.

8. A time delay device as claimed in claim 7, wherein viewed in a direction transverse to the surface of the epitaxial layer, the gate electrode of the field-effect transistor has a closed shape, the part of the epitaxial layer which is surrounded by the gate electrode forming the drain region of the transistor, and at least a part of the epitaxial layer present outside the gate electrode forming the source region of the transistor.

9. A time delay device comprising a field-effect transistor having a semiconductor body comprising spaced source and drain regions of one type conductivity defining therebetween a channel region of said one type conductivity and a gate electrode for controlling the conduction level of the channel region, said transistor having low conduction and high conduction level states dependent upon the conduction level of its channel, source and drain terminals connected respectively to the source and drain regions, a utilization circuit connected to the source and drain terminals and including a source of potential and a load actuable upon the transistor reaching its high conduction level state, said gate electrode when voltage pulsed establishing a depletion region in the channel reducing the conduction in the channel to a low level, means for applying a voltage pulse to the gate electrode to establish a depletion region in the channel and set the transistor into its low conduction level state, and means for automatically increasing the conduction in the channel to a high level after a controlled time interval, said conduction increasing means including means furnishing free carriers causing contraction of the depletion region and increased channel conduction at a controlled rate producing the high conduction level state and actuation of the load at the end of the controlled time interval.

10. A time delay device as claimed in claim 9, wherein the field-effect transistor is a junction field-effect transistor.

11. A time delay as claimed in claim 10, wherein the device comprises a first junction field-effect transistor having a source region and a drain region with an intermediately located channel region of a first conductivity type, the conduction increasing means comprising a rectifying junction located in one of the source region and drain region of the first transistor, and a second junction field-effect transistor having a source region, a drain region and an intermediately located channel region of one conductivity type, and a gate electrode which is conductivity connected to the gate electrode of the said first field-effect transistor.

12. A time delay device as claimed in claim 11, wherein the channel region of said first field-effect transistor has a smaller thickness than the channel region of said second field-effect transistors so that a depletion region can be formed in the channel region of said second field-effect transistor by applying a voltage to the gate electrodes of the field-effect transistors, said depletion region having a larger thickness than the depletion region which is formed in the channel region of said first field-effect transistor.

13. A time delay device as claimed in claim 12, wherein the semiconductor body comprises an epitaxial layer of one conductivity type on a substrate of the opposite conductivity type, the source and drain regions being located in the epitaxial layer, the substrate forms a common gate electrode for said two field-effect transistors, buried zones which have the same conductivity type as and a higher doping than the substrate are provided at the area of the interfaces between the substrate and the channel region of said first field-effect transistor and between the substrate and the channel region of said second field-effect transistor, the rectifying junction of the conduction increasing means being formed by a p-n junction between the epitaxial layer of one conductivity type and a surface zone of the opposite conductivity type provided in the epitaxial layer.

14. A time delay device as claimed in claim 13, wherein said second field-effect transistor comprises an insulated gate electrode which is provided on an insulating layer present on the surface of the epitaxial layer and separated from the epitaxial layer by said insulating layer and which, viewed in a direction transverse to the surface of the epitaxial layer, is present between the source region and the drain region of the said transistor.

15. A time delay device as claimed in claim 13, wherein at the area of the channel region of said first field-effect transistor an oxide layer is provided inset in the epitaxial layer from the surface of the epitaxial layer over at least a part of its thickness and, together with the oppositely located buried zone of the opposite conductivity type, defining the thickness of the channel region of said first field-effect transistor.

* * * * *